United States Patent Office 2,766,476
Patented Oct. 16, 1956

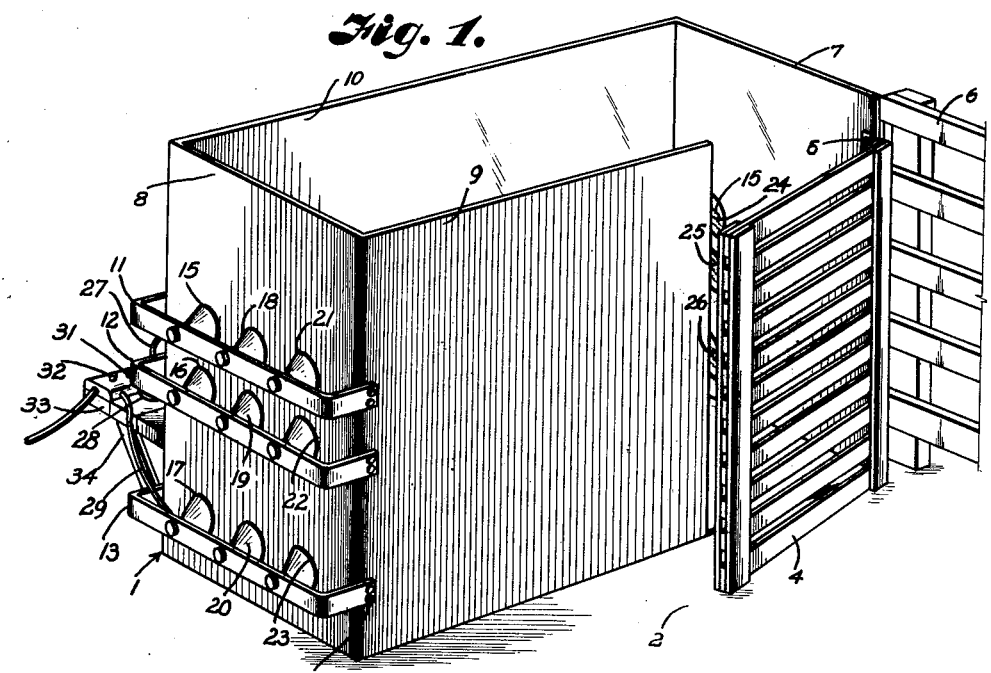
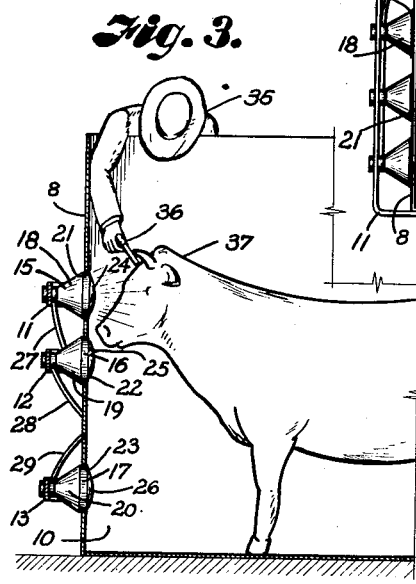
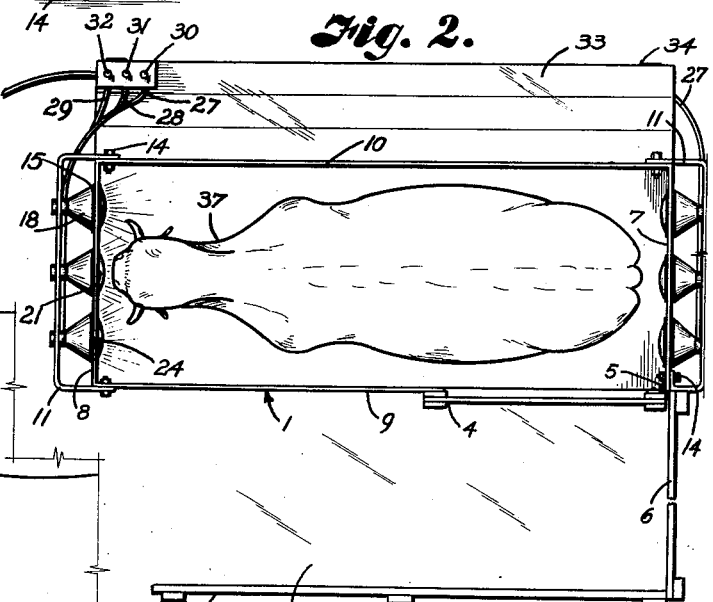
Fig. 1.
Fig. 2.
Fig. 3.
INVENTOR.
Harold P. Watson.
BY
ATTORNEYS.

2,766,476
APPARATUS FOR SLAUGHTERING ANIMALS

Harold P. Watson, St. Joseph, Mo., assignor to The Seitz Packing Company, Inc., St. Joseph, Mo., a corporation of Missouri Application March 24, 1955, Serial No. 496,520

3 Claims. (Cl. 17—1)

This invention relates to apparatus for slaughtering animals and particularly quieting the animals just prior to killing.

The principal object of the present invention is to provide apparatus for slaughtering animals in a humane manner and whereby the danger of wounding the animal without rendering it unconscious or killing it practically instantaneously can be avoided.

In the slaughtering of animals it is desirous to kill the same with the least excitement possible immediately before killing. The animals are usually driven into a pen and become very excited and immediately are taken to the slaughtering chute or pen and hit in the head with a hammer and unless the animal's head remains very still there is a great danger of only wounding the animal instead of rendering it unconscious with the first blow.

There has been devised a gun for killing the animals wherein a plunger is extruded or extended from the end of the barrel from blasts of powder to the extent of one-half to one inch. This necessitates the placing of the point of the barrel of the gun immediately against the head of the animal so that the plunger will pierce the skull and enter the brain of the animal to render it immediately unconscious and killing the same. This also requires that the animal be completely still so that the gun may be placed against the forehead at the vulnerable point.

In use of my apparatus I contemplate driving the animal through a runway or chute to a slaughtering pen, which is provided with one or more lights of sufficient strength to momentarily blind the animal so that it will remain quiet and allow the gun to be placed against the head of the animal to kill it or the use of the hammer to knock it in the head. Use of my apparatus also contemplates quieting the animal so that the animal will be relaxed and thus tend to decrease the temperature of the blood to allow free bleeding when the throat of the animal is cut.

Other objects of the present invention are to provide a pen having a gate leading from a runway so that the animals may be driven thereinto singly or in pairs; to provide a plurality of lights in the ends of the pen so that when the animal immediately enters the pen it will be facing the light and thereby become immediately blinded from the glare therefrom; to provide a platform along one side of the killing pen upon which the operator may stand and reach over into the pen to either knock the animal in the head or use a gun for killing the same; and to provide a device of this character simple and economical to manufacture.

In accomplishing these and other objects of the invention I have provided improved details of structure for carrying out my invention, the preferred forms of which are shown in the accompanying drawings wherein:

Fig. 1 is a perspective view of my invention.

Fig. 2 is a top plan view of the device showing an animal therein facing the light.

Fig. 3 is a partly diagrammatic view showing the side of the animal facing the light.

Referring more in detail to the drawings:

1 designates a pen in which animals may be killed before dressing having a runway or a chute 2 defined by a wall 3 and having a gate 4 through which the animals are delivered to the pen 1, the gate being hinged in the usual manner as indicated at 5 to swing back against the wall 6 of the chute. The killing pen 1 has end walls 7 and 8 and side walls 9 and 10.

My apparatus contemplates the placing of one or more lights in each end of the killing pen and I have here illustrated a plurality of U-shaped brackets 11, 12 and 13 secured by bolts or the like 14 in the respective sides 9 and 10 of the pen for supporting a plurality of light sockets 15, 16 and 17 spaced in said brackets and provided with reflectors 18, 19 and 20 engaging in openings 21, 22 and 23 in the ends 7 and 8 of the pen. The light sockets 15, 16 and 17 are adapted to receive the usual bulbs (not shown) and the reflectors are provided with glass coverings 24, 25 and 26 which necessarily must be of rather heavy material so that they will not be broken by the animals coming in contact therewith. These glass portions extend into the pen slightly as best illustrated in Fig. 2. The sockets are connected by wires 27, 28 and 29 leading to a source of supply (not shown) and also provided with switches for each series of lights as indicated at 30, 31 and 32 (Fig. 2) for selectively illuminating the desired row of lights 15, 16 and 17.

It will be obvious that the series of lights 15, 16 and 17 are provided for use selectively in the slaughtering of animals of different size. For instance, with calves the lower lights would be illuminated and for medium-sized animals the center lights and for large animals the upper lights.

A platform or walkway 33 is provided along one side of the killing pen upon which the operator or person handling the gun or hammer may stand to reach into the pen to kill the animal. The platform is secured to the side of the killing pen in any suitable manner and has braces 34 for supporting the same as illustrated in Fig. 1. I have here illustrated the operator 35 holding a gun 36 against the head of the animal 37.

It will be obvious from the foregoing that I have provided an improved apparatus for the slaughtering of animals in a humane manner whereby the animal will be quieted by the illumination of lights in the killing pen and in effect blinding the animal momentarily so that the operator of the gun or hammer may strike the animal at the desired place to instantly render the animal unconscious or kill the animal.

What I claim and desire to secure by Letters Patent is:

1. Apparatus for quieting animals before slaughtering by a blow in a vulnerable spot on the head comprising, a pen having sides and end walls for confining the animal, and illuminating means carried by at least one of the end walls for momentarily blinding the animal before rendering the blow on the head.

2. Apparatus for quieting animals before slaughtering by a blow in a vulnerable spot on the head comprising, a killing pen for housing an animal facing one end of the pen, and illuminating means carried by the ends of the pen to momentarily blind the animal upon entering the pen.

3. Apparatus for quieting animals before slaughtering by a blow in a vulnerable spot on the head comprising, a rectangular shaped pen for housing one or more animals facing the ends of the pen, a plurality of lights carried by the ends of the pen, and means for illuminating said lights to momentarily blind the animals and quieting the same upon entering the pen.

References Cited in the file of this patent

UNITED STATES PATENTS

| | | |
|---|---|---|
| 2,252,191 | Marks | Aug. 12, 1941 |
| 2,526,037 | Murphy | Oct. 17, 1950 |
| 2,537,387 | Wnetrzak | Jan. 9, 1951 |